Nov. 26, 1974   S. BEYER   3,851,028
METHOD FOR SHAPING EXTRUSION-MOULDED ARTICLES MADE OF
SYNTHETIC PLASTICS MATERIAL
Original Filed April 15 1970   2 Sheets-Sheet 2

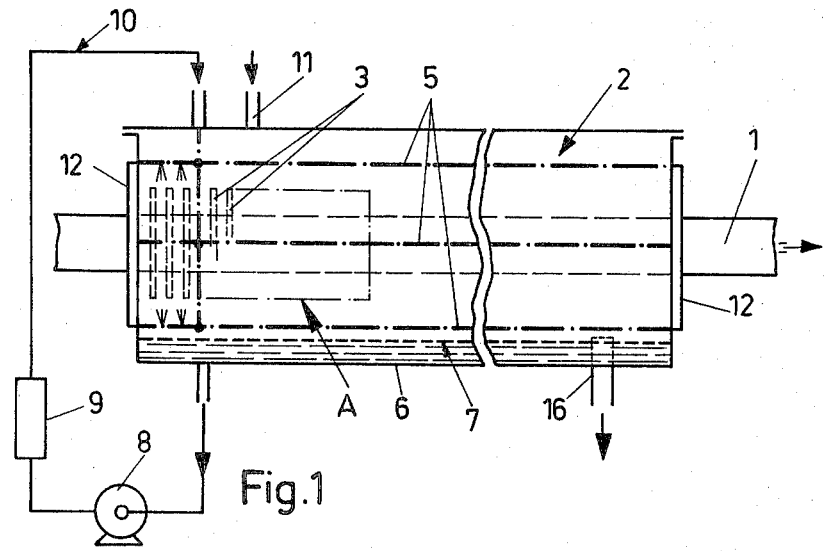
Fig. 1
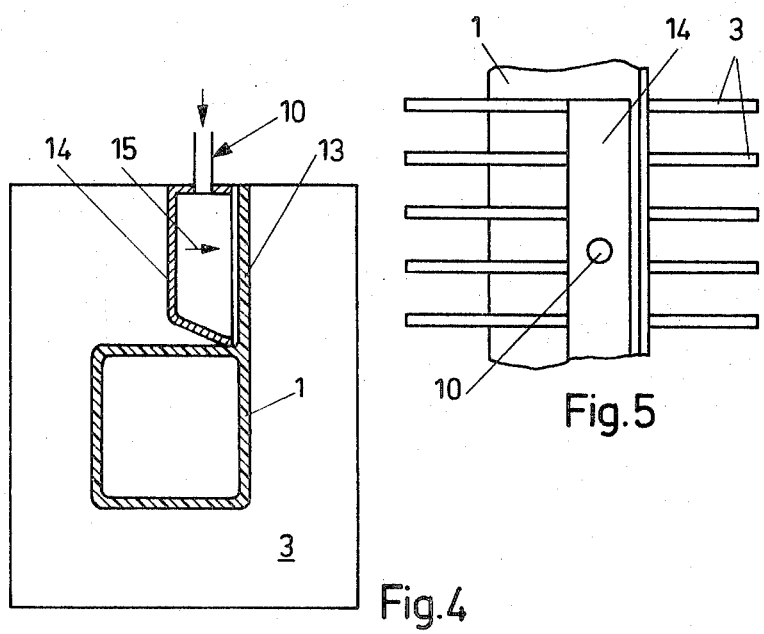
Fig. 4
Fig. 5
INVENTOR
SIEGFRIED BEYER
ATTORNEY

INVENTOR
SIEGFRIED BEYER
ATTORNEY

United States Patent Office 3,851,028
Patented Nov. 26, 1974

3,851,028
METHOD FOR SHAPING EXTRUSION-MOULDED ARTICLES MADE OF SYNTHETIC PLASTICS MATERIAL
Siegfried Beyer, 22 Saalburgstrasse,
6 Nieder Eschbach, Germany
Continuation of abandoned application Ser. No. 28,633, Apr. 15, 1970. This application June 9, 1972, Ser. No. 261,480
Claims priority, application Germany, Apr. 24, 1969, P 19 20 837.8
Int. Cl. B29c 17/07, 25/00
U.S. Cl. 264—89                                     7 Claims

ABSTRACT OF THE DISCLOSURE

Method for shaping extrusion-moulded articles made of synthetic plastics material. The shaping is carried out with simultaneous cooling, characterised in that a sprayed-on cooling liquid and a gaseous medium are simultaneously caused to act upon the articles, and in that, in this process the gaseous medium is under low pressure.

---

This application is a continuation of copending application Ser. No. 28,633, filed April 15, 1970, and now abandoned.

The invention relates to a method for shaping (which can also be referred to as gauging, sizing or calibrating) extrusion-moulded articles made of synthetic plastics materials, irrespective of whether their cross-sections are closed or open, e.g. U- or T-shaped, or a combination of these.

In this specification, the word "shaping" means adjusting or setting the geometrical cross-sections of the extrusion-moulded articles, which—as is well known—frequently become distorted after leaving the plastics extruder due to dimensional instability of the synthetic plastics material, especially thermoplastic synthetic plastics material, when still warm, relaxation phenomena or thermal shrinkage.

Various devices are known for shaping, i.e. dimensioning and cooling, extrusion-moulded articles made of thermoplastic synthetic plastics material.

For example, it is known to treat articles issuing from an extruder with ultrasonic waves in a vibrator drum filled with water, the theory being that spherolite-forming thermoplastic polymers will thereby be avoided. In this process, a cooling chamber, filled entirely with water alone is connected to the dimensioning-chamber.

In another known device, the issuing extruded material is likewise surrounded by water on all sides, and a low-pressure chamber (vacuum chamber) is located above the water. In this device, just as in the first-mentioned device, the hydrostatic forces act on the article to be dimensioned in different ways, and thus exert adverse effects with regard to the shaping of the article. Even when—as is the case in this second device—a low-pressure chamber is located above the water bath, this does not prevent the hydrostatic forces from acting with differing degrees of strength on the article.

Furthermore, because of the buoyancy of the water, high throughput speeds are not attainable in either of the above devices.

In another known extruding device the extruded material is cooled by means of a support device connected to the output of the extruder in which a liquid cooling-agent is circulated. No actual dimensioning takes place, and no great cooling effect is hereby achieved.

Finally, in yet another known device, liquid is also vapourised in the helical channels of a tube which is connected to the output of the extruder. In this process, due to low pressure, heat is lost from the liquid by vapourisation and the extruded workpiece is thereby cooled. However, in this device, the speed of the column of liquid—and therefore the heat transmission—is low. Presumably higher heat-transmission is only possible in the locally restricted zone where the liquid is actually vapourising; however, this zone is not uniformly distributed over the entire surface of the extruded material.

The present invention aims to achieve the greatest possible heat transmission during the shaping of extruded material, whilst avoiding the disadvantages which have been outlined above, so that a particularly high throughput speed can be realised.

Accordingly, the method for shaping extrusion-moulded hollow articles made of synthetic plastic material, whose interior space is under atmospheric pressure (the dimensioning being carried out while the article is cooled) comprises spraying the article with a cooling-liquid in the presence of a low pressure gaseous medium.

Advantageously, a wetting agent and/or lubricating agent for the surface of the hollow article is/are added to the cooling-liquid.

The apparatus for carrying out the method of the invention has a single cooling chamber fitted with several shaping discs or plates having apertures which are adapted to correspond to the desired profiles of the extrusion-moulded hollow articles, which discs or plates are arranged one behind the other in the cooling chamber and are spaced apart from one another, and the apparatus also has, between the shaping discs or plates and the inner wall of the cooling chamber, a space in which spraying devices for the cooling liquid are arranged; and, for the gaseous medium, the suction nozzle or tube of a low pressure source is connected to the wall of the cooling chamber.

In an advantageous embodiment of the apparatus according to the invention, the bottom of the cooling chamber contains a sunken recess for the cooling liquid, and a cooling liquid system having a circulation pump and, if necessary, a heat exchanger is connected between the said recess and the spraying device.

In a further advantageous embodiment of the apparatus according to the invention, the cooling chamber is sealed-off and, on the inlet side and the outlet side, is provided with sealing means in the form of elastic discs or the like; and, for filling-up with the cooling fluids, in particular the cooling liquid system, a pipe or nozzle is provided, preferably in the upper part of the chamber; and the suction nozzle or tube of the vacuum pump, which is preferably situated in the bottom of the cooling chamber, terminates above the sunken recess.

According to the invention, the cooling chamber may be extended in the direction of the extrusion moulding, beyond the shaping discs or plates, purely as a cooling zone having spraying devices alone.

Also, the disc or plate apertures may taper from one shaping disc or plate to another.

In an apparatus according to the invention, suitable for forming flat articles or articles with flanges, contact-pressure chambers are associated with the shaping discs or plates in the region of the flange, said contact-pressure chambers being connected to the cooling liquid system or to another pressure means.

The contact pressure chambers may extend over the space between adjacent shaping discs or plates, or may be joined together to form one continuous contact-pressure chamber.

Further features, advantages, and possibilities of application of the invention can be seen from the appended drawings of an embodiment of the invention, and from the ensuing description.

In the drawings:

FIG. 1 is a side view of an apparatus according to the invention,

FIG. 5 is a side view of the apparatus shown in FIG. 4.

Figure 2:
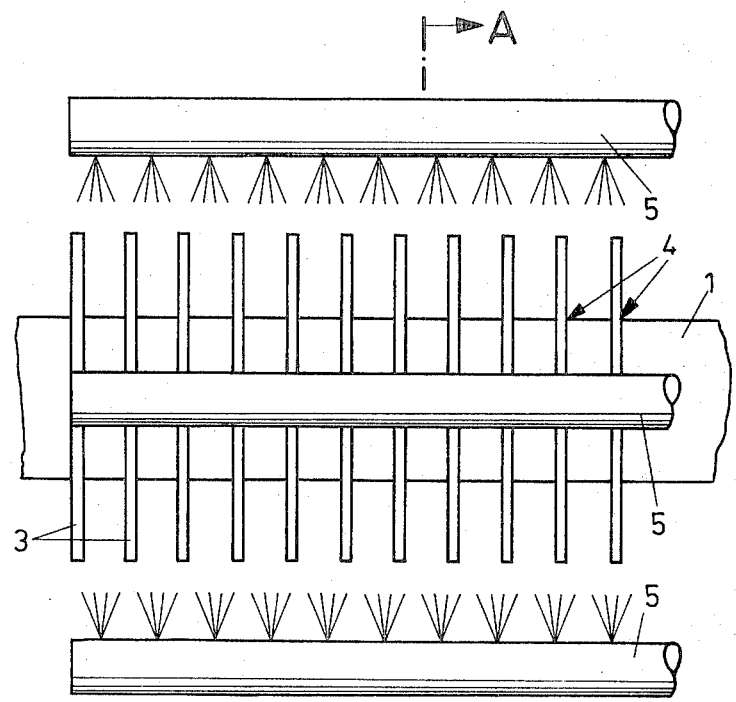
FIG. 2 is the portion indicated at A on FIG. 1, shown on an enlarged scale, with the front wall of the cooling chamber removed.

The apparatus illustrated in the drawings, for shaping and simultaneously dimensioning and cooling, extrusion moulded articles made of synthetic plastics material, consists, in its basic construction, of a cooling chamber 2 containing dimensioning and cooling devices. The cooling chamber 2 has a plurality of shaping discs or plates 3 which are arranged one behind the other, and which are provided with apertures 4 which are adapted to correspond to the cross-section of the extrusion-moulded article. Spraying devices 5 for spraying a liquid cooling medium are located near the shaping discs or plates 3 and, in this embodiment, extend along the extrusion-moulded articles 1 in the cooling chamber 2. These spraying devices 5 spray cooling liquid on to the article 1 which is to be dimensioned and the said cooling liquid acts simultaneously as a lubricating agent. Water, to which a wetting agent and/or lubricating agent may be added, is commonly used as the cooling liquid, but other liquids may also be used, e.g. emulsions such as are used in the machining of metals and the like to remove shavings or chips.

In order that the apparatus shall use only a relatively small quantity of liquid, a sunken recess 7 is located in the bottom 6 of the cooling chamber 2, for drawing-off the liquid cooling medium. Between the sunken recess 7 and the spraying devices 5 is connected a circulating system 10 having a circulation pump 8 and a heat exchanger 9 for cooling purposes.

In the device according to the invention, the shaping discs or plates 3 are simple discs, made, for example, of sheet steel or other suitable material. They have apertures 4, which correspond to the dimensions of the article which is to be shaped.

It may be desirable to make these apertures 4 a little smaller from disc to disc, in the direction of the extrusion moulding, i.e. to taper them or narrow them so that the dimensioning takes place as if it were a drawing process, since a drawing-off device is generally suitably connected to the output of the apparatus.

Figure 3:
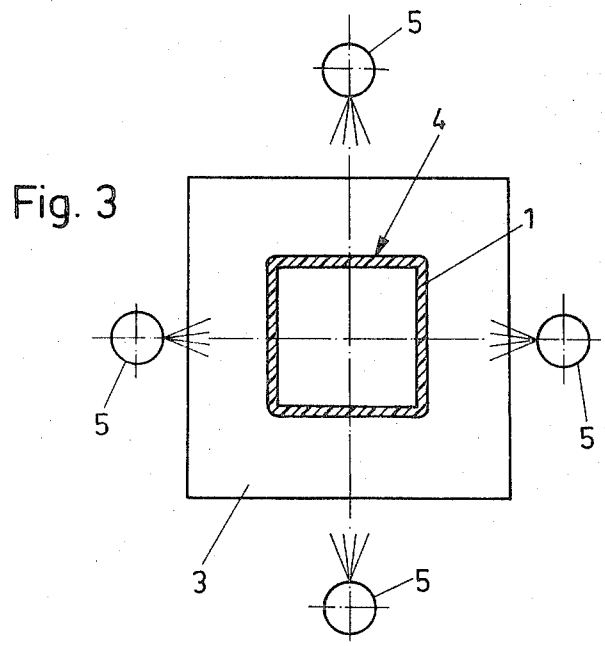
FIG. 3 is the section A—A shown on FIG. 2, FIG. 4 corresponds to FIG. 3, but shows another embodiment of the invention.

FIGS. 1-3 illustrate an apparatus suitable for making hollow articles whose interiors are under atmospheric pressure. In this apparatus the cooling chamber 2 is sealed-off together with the cooling-liquid system 10 and is connected to the suction tube or nozzle 16 of a low pressure source. At the inlet and the outlet of the chamber 2 are provided sealing means in the form of elastic discs 12 or the like.

The pipeline 11 is provided for filling-up or topping-up the apparatus with cooling fluids, i.e. not only liquid coolants but also gaseous coolants. During the operation of the apparatus, the cooling fluids are unavoidably carried out of the cooling chamber, despite the sealing of the cooling chamber, in the form of a wetting skin on the dimensioned and cooled article 1. Also, the cooling fluids are also partially drawn-off from the cooling chamber 2 through the suction tube or nozzle 16 of the low pressure source.

FIGS. 4 and 5 show a second embodiment suitable for forming hollow articles 1 having flanges 13. Here, the apparatus is so constructed that the shaping discs or plates 3 are associated with contact-pressure chambers 14 in the region of the flange 13. The contact-pressure chambers are connected to the liquid system 10 or to another pressure means. In this way a force is produced, acting in the direction of the arrow 15. In the embodiment illustrated, see FIG. 5, the contact-pressure chambers 14 of adjoining shaping discs or plates 3 are joined together to form one continuous contact-pressure chamber 14.

The advantages achieved by the invention are considered to reside in the possibility of faultlessly shaping, i.e. dimensioning and cooling, extrusion-moulded articles in particular those made of synthetic thermoplastic material, directly after extrusion. Furthermore the shaping can be conducted at the high speeds of an extrusion-casting press so that fast and accurate shaping of the extruded material is achieved.

A further advantage is that immediately after extrusion a hardened boundary layer is formed on the surface of the extrusion-moulded articles. This results from the cooling and also from the rebounding effect of the liquid cooling medium impacting on the surface of the extruded material. This hardened boundary layer which is already present between the first shaping discs or plates 3, acts in a stabilising manner and, as it were, supports the whole extrusion-moulded article. It is therefore sufficient, as is described above, to arrange the shaping discs or plates 3 only along a small portion of the length of the cooling chamber.

The cooling action is particularly efficient when a wetting and/or lubricating agent is added to the cooling liquid, since heat transfer is improved. Since the liquid cooling medium, especially if a lubricating agent is present, reduces the friction resistance to a minimum, the force which has to be applied to the drawing-off device merely performs the dimensioning work.

It has been found that due to the spraying of the liquid cooling medium together with the associated action of the low pressure gaseous cooling medium, a sudden cooling is brought about on the surface of the article, and this cooling is an improvement by 2 or 3 powers of ten over known methods. Due to this rapid cooling, and to the substantially lower friction (already mentioned above) on the shaping discs or plates, a considerably greater throughout speed is achieved, together with precise shaping. Furthermore, the length of the whole shaping stage is shortened.

I claim:

1. Method for shaping hollow extruded articles of synthetic thermoplastic which comprises
   (1) passing a still warm hollow, extruded article through a zone sealed off at the inlet and outlet and containing a low pressure gaseous medium created by applying suction to said zone, the interior of said hollow article being under atmospheric pressure;
   (2) dimensioning said hollow article by the action of said suction and cooling said hollow article simultaneously in said zone while applying said suction to said zone;
   (3) dimensioning said hollow article in said zone by passing said hollow article in the presence of said low pressure gaseous medium through spaced apart shaping plates arranged one behind the other in said zone, said plates having apertures corresponding to the profile of said hollow article, said suction conforming said hollow article to the apertures of said shaping plates; and
   (4) simultaneously cooling said hollow article in said zone by spraying said hollow article between said shaping plates with a cooling liquid from sources located near said shaping plates and extending along said hollow article and said shaping plates thereby forming a hardened boundary layer on the surface of said hollow article immediately after extrusion which stabilizes and supports said hollow article as it passes through said zone.

2. Method of claim 1 wherein said hollow article is sprayed with a cooling liquid from sources extending along and about said hollow article.

3. Method of claim 1 wherein said zone extends in the direction of extrusion beyond said shaping plates and said hollow article is sprayed in the extended zone as in step (4).

4. Method of claim 1 wherein said hollow article is extruded with a flange and said shaping plates are associated with contact pressure zones in the region of said flange which produce a force which acts on said flange.

5. Method of claim 4 wherein contact pressure zones of adjoining shaping plates are joined together to form one continuous contact pressure zone.

6. Method of claim 1 wherein said plate apertures taper from one plate to another in the direction of extrusion.

7. Method of claim 1 wherein a member selected from the group consisting of a wetting agent, a lubricating agent and a mixture thereof is added to said cooling liquid.

References Cited

UNITED STATES PATENTS

| 3,378,887 | 4/1968 | Reib et al. | 260—90 X |
| 3,473,194 | 10/1969 | Farrow | 264—90 X |
| 1,892,028 | 12/1932 | Alderfer | 62—100 X |
| 3,668,288 | 6/1972 | Takahashi | 264—209 X |
| 2,451,986 | 10/1948 | Slaughter | 264—177 R X |
| 2,452,884 | 11/1948 | Werner | 264—177 R X |

FOREIGN PATENTS

| 853,745 | 11/1960 | Great Britian | 264—209 |

JAN H. SILBAUGH, Primary Examiner

U.S. Cl. X.R.

264—90, 93, 177 R, 209, 237; 425—71, 72, 326